US005615246A

United States Patent [19]
Beveridge

[11] Patent Number: 5,615,246
[45] Date of Patent: Mar. 25, 1997

[54] METHOD AND APPARATUS FOR SPURIOUS SIGNAL DETECTION AND DISCONNECTION IN A HYBRID FIBER/COAX NETWORK ARCHITECTURE

[75] Inventor: Gregory J. Beveridge, Thornton, Colo.

[73] Assignee: US West Technologies, Inc., Boulder, Colo.

[21] Appl. No.: 415,107

[22] Filed: Mar. 31, 1995

Related U.S. Application Data

[63] Continuation-in-part of Ser. No. 357,558, Dec. 16, 1994, Pat. No. 5,469,495, which is a continuation of Ser. No. 69,227, May 28, 1993, abandoned.

[51] Int. Cl.$^6$ ............................................. H04M 11/00
[52] U.S. Cl. ............................. 379/56; 455/1; 455/26.1; 348/13; 348/12
[58] Field of Search ............................. 379/56, 406, 407, 379/414, 417, 187, 413, 183, 194, 177, 195, 184, 7, 8, 32, 35; 359/179, 173, 123, 124, 125, 118, 137, 171, 174, 176, 177; 370/110.1, 14, 17, 13, 85.3, 85.1, 16, 85.2; 348/6, 7, 8, 12, 13, 14, 16, 17; 380/6, 7, 10, 15, 20, 23, 8; 455/1, 5.1, 26.1, 4.2, 4.1, 63, 67.3; 395/180, 181, 183.01, 184.01, 185.01

[56] References Cited

U.S. PATENT DOCUMENTS

| | | | |
|---|---|---|---|
| 4,008,369 | 2/1977 | Theurer et al. | 348/8 |
| 4,035,838 | 7/1977 | Bassani et al. | 348/12 |
| 4,367,548 | 1/1983 | Cotten, Jr. | 370/3 |
| 4,441,180 | 3/1984 | Schussler | 370/3 |
| 4,450,477 | 5/1984 | Lovett | 358/86 |
| 4,654,866 | 3/1987 | Bottle et al. | 348/16 |
| 4,686,667 | 8/1987 | Ohnsorge | 370/4 |
| 4,792,848 | 11/1988 | Nussrallah et al. | 348/7 |
| 4,860,287 | 8/1989 | Kelly | 370/108 |
| 4,891,694 | 1/1990 | Way | 455/4.2 |
| 4,901,348 | 2/1990 | Nichols et al. | 455/1 |
| 4,901,367 | 2/1990 | Nicholson | 348/12 |
| 4,928,272 | 5/1990 | Ohue | 348/12 |

(List continued on next page.)

FOREIGN PATENT DOCUMENTS

| | | |
|---|---|---|
| 0050435 | 8/1980 | European Pat. Off. . |
| 0024618 | 3/1981 | European Pat. Off. . |
| 0421602 | 4/1991 | European Pat. Off. . |
| 2237709 | 5/1991 | United Kingdom . |
| 2252022 | 7/1994 | United Kingdom . |
| 9210038 | 6/1992 | WIPO . |

OTHER PUBLICATIONS

European Conf. on Optical Communication; Genoa, Italy; 1978 Miki et al.; two–way WDM Transmission.
Conceptual Design of a Switched Television–Distribution System Using Optical–Fiber Waveguides; Hara; IEEE Transactions; 1977; pp. 120–130.
Voice Follows Video: CED: Communications Engineering and Design: Jun. 1993; p. 67.
ADC Launches Fiber Coax Platform; Telephony; May 24, 1993; pp. 11–12.
Omaha Selected For Broadband Roll–out; U S West Today; Apr. 26, 1993, vol. 6, No. 7; p. 1.
Bell's Brash CEO Bets Big on TV Dream; USA Today; Apr. 22, 1993; pp. b 1, 2.
U S West Picks Omaha To Test New Data Network; The Denver Post; Apr. 24, 1993; pp. C 1, 2.
Homeworx Fiber In The Loop System; ADC Telecommunications; Jun. 1992.

(List continued on next page.)

Primary Examiner—Curtis Kuntz
Assistant Examiner—Michael B. Chernoff
Attorney, Agent, or Firm—Timothy R. Schulte; Stephen F. Jewett; Peter J. Kinsella

[57] ABSTRACT

A device for detecting the presence of spurious energy on a bus based network. The device identifies the subscriber location which is the source of spurious energy and includes disconnection capability to remove that subscriber location from the network.

38 Claims, 7 Drawing Sheets

U.S. PATENT DOCUMENTS

| | | | |
|---|---|---|---|
| 4,991,206 | 2/1991 | Blais | 455/1 |
| 5,014,125 | 5/1991 | Pocock et al. | 348/7 |
| 5,027,426 | 6/1991 | Chiocca, Jr. | 348/14 |
| 5,091,935 | 2/1992 | Meriwether et al. | 455/1 |
| 5,142,574 | 8/1992 | West, Jr. et al. | 455/1 |
| 5,181,106 | 1/1993 | Sutherland | 348/7 |
| 5,185,738 | 2/1993 | Kelly | 370/95.1 |
| 5,189,673 | 2/1993 | Burton et al. | 370/110.1 |
| 5,208,854 | 5/1993 | West, Jr. | 380/7 |
| 5,218,714 | 7/1993 | Ishibashi | 348/6 |
| 5,245,420 | 9/1993 | Harvey et al. | 348/7 |
| 5,278,889 | 1/1994 | Papanicolaou et al. | 348/14 |
| 5,287,539 | 2/1994 | West, Jr. | 455/1 |
| 5,303,229 | 4/1994 | Withers et al. | 359/125 |
| 5,311,325 | 5/1994 | Edwards et al. | 348/5.5 |
| 5,317,635 | 5/1994 | Stirling et al. | 380/7 |
| 5,323,462 | 6/1994 | Farmer | 380/7 |

OTHER PUBLICATIONS

Homeworx Fiber in the Loop System Fron ADC Telecommunications, A Partner in the Expanding Network; Mar. 1992.

Phone, Cable Deals Let U.S. Test Future; USA Today; Jun. 26, 1993, pp. B 1, 2.

Rochester Tel Taps ADC For Video Trial; Telephony; May 31, 1993, pp. 8–9.

First Pacific Networks' Wideband Personal Xchange; Telephone News; Aug. 28, 1989; vol. 10, No. 33.

Cable, Phone Firms Wrangle Over Future; USA Today; Feb. 11, 1993; pp. B1, B2.

The Advantages of Using Cable TV Distribution Plant for Linking PCS–Microcells by Andrew Beasley; Feb. 1992; IEEE; pp. 292–295.

Integration of Cordless Telephony with CATV Distribution; D. W. Hardwick; 1992; IEEE; pp. 87–90.

STAR: PHYSICAL POINT-TO-MULTIPOINT TRANSMISSION

PRIOR ART

BUS: SHARED BANDWIDTH TRANSMISSION

FIG. 2B

PRIOR ART

METHOD AND APPARATUS FOR SPURIOUS SIGNAL DETECTION AND DISCONNECTION IN A HYBRID FIBER/COAX NETWORK ARCHITECTURE

CROSS REFERENCE TO RELATED APPLICATION

This application is a continuation-in-part of U.S. patent application Ser. No. 08/357,558 filed Dec. 16, 1994, now U.S. Pat. No. 5,469,495 and entitled Method and Apparatus for Delivering Secured Telephony Service in a Hybrid Coaxial Cable Network which is a continuation of U.S. Ser. No. 08/069,227 filed May 28, 1993 of the same title, now abandoned. These applications are, and always have been, commonly assigned and are hereby incorporated by reference.

BACKGROUND OF THE INVENTION

1. Field of the Invention

The invention relates to the field of telecommunications. More particularly the invention relates to the field of multiplexed communications. In still greater particularity, the invention relates to a method of removing harms to telephony and other services delivered through bus-based hybrid fiber coaxial cable (HFC) networks. By way of further characterization, but not by way of limitation thereto, the invention uses detection and automatic disconnection of spurious (jamming) signals that may emanate from one or more end-user customer locations connected to an HFC network.

2. Description of the Prior Art

Information, and access to it, has received significant attention recently. The building of an "information highway" compared to the national interstate highway system begun in the 1950s has been made a national priority. There are currently three wireline transport elements available for such a highway: (1) fiber optic cable; (2) coaxial cable; and (3) twisted copper pair cable ("twisted pair"). Presently, twisted pair cable predominates, certainly in the local loop portion of telephone networks. Coaxial cable has been used widely by cable television companies. Both telephone companies and cable companies have made use of fiber optics for main or trunk line signal transport.

Fiber optic cable can carry more information over a greater distance than coaxial cable, while coaxial cable can carry more information over a greater distance than twisted pairs. Because twisted pair is the predominant local loop technology, at least in the telephone industry, attempts have been made to develop technologies which will increase the carrying capacity of copper. In reality, copper wire is a very efficient transport means for traditional telephony services.

Within the telephony industry, the term "broadband" denotes a very high digital line rate, such as the 156 Megabits per second (Mb)s) optical line rate of new SONET OC3-level fiber optic systems. The term "baseband" describes the original (unmodulated) form of the electrical or optical signal associated with a single service that is typically presented to the network by a subscriber, and the final form of that signal presented from the network to a subscriber. The baseband signal can be either analog or digital in form, and is further characterized as the direct electromagnetic representation of the base information to be transmitted, with no other carrier or subcarrier energy present. A baseband signal may be carried directly on a transmission line, such as a twisted pair of insulated copper wires or an optical fiber. A baseband signal may also be used to modulate a carrier signal for transmission on a variety of transmission systems (e.g., radio). In telecommunications, the term "passband" describes the range of frequency spectrum which can be passed at low transmission loss through a linear transmission system. Modulated carrier signals presented to such a system will be delivered in their original form with minimal loss and distortion, as long as such signals fall within the absolute limits of the passband range of frequencies and the dynamic range of signal amplitude for a given linear transmission system.

An example should help clarify the relationship between baseband and passband. The electrical signal that is present at a telephone jack during a conversation is the baseband electrical signal representation of the talker's voice. This baseband signal is typically transported to the telephony switching office by a twisted pair of insulated copper wires. At the central office, the signal goes through the switch and is typically converted to digital form and multiplexed in the time domain for transmission through baseband digital transmission systems that carry such signals on copper or fiber optic cables to other locations. The baseband digital transmission system may carry thousands of individual telephone calls on the same transmission line. Even though there are multiple calls in progress on the same transmission line, such a system is still defined as "baseband" because there is no modulation of a carrier or subcarrier signal anywhere in the system, and, at any given instant of time, there is only a single subscriber's signal actually present at a given point on the line. As the original talker's signal reaches the other switching office involved on the call, it is converted back to the original analog form and put on the copper pair connected to the far-end telephone set, once again in baseband form.

Passband techniques can also be used to provide telephony services. In cable television systems configured for telephony services, the baseband analog telephone signal is used to modulate a carrier signal. The modulated carrier signal can be assigned a particular frequency within the passband of the linear transmission system. A number of such modulated carrier signals, each assigned a different carrier frequency in the passband, can be transmitted all at the same time without mutual interference. At the far end, a selected modulated carrier signal must be demodulated to remove the carrier signal and recover the baseband signal associated with the service. If the linear transmission system is operating properly, the derived signal will be delivered to the far-end telephone set, once again in baseband form.

Fiber optic-based systems are preferable to copper-based networks because of their high bit rate transport capability. Information services that require true broadband rates require fiber or coaxial cable technology, as a practical matter. Even low-end (i.e., POTS "plain old telephone service") services will reflect a lower per-subscriber cost on fiber, compared to present copper-based delivery systems. Specifically, fiber-based systems that provide residence telephony to groups of 4–8 subscribers with fiber to the curb (FTTC) are expected to achieve cost parity with copper in the near future. However, the cost to replace the existing copper plant in the U.S. with fiber optics is estimated at hundreds of billions of dollars. Thus the length of time required to achieve this conversion could be decades.

One possible alternative to fiber or copper networks is a hybrid network which utilizes existing facilities and employs fiber optics, coaxial cable and copper wiring. Such a network would allow the delivery of many advanced services and yet be more cost efficient to allow earlier conversion to a broadband network with significant fiber optic capability included.

In general, hybrid networks combine a telephony network and a video network. One drawback of such a network is some duplication of equipment required to transport the separate signals. That is, if, for example, the telephony services could be sent over the video network, then a substantial portion of the cost and complexity of the hybrid network could be eliminated. However, in order to send telephony and video signals over the same transport medium, the unique characteristics of each signal must be addressed. For video signals this is not as difficult as some of the issues surrounding transport of telephony signals. That is, video signals are generally sent in one direction, from the provider to the subscriber, while telephony requires two-way transport. As video evolves into interactive video, however, two-way video signal transport issues will also become significant. When telephony or interactive video signals are carried on a bus-based network there exists the potential for the introduction of spurious signal (jamming) energy which would harm the network.

The Federal Communications Commission (FCC) has codified regulations to address the issue of harms to the network. Part 68 of the Code of Federal Regulations (CFR) defines harms to the telephone network, to third parties, and to billing systems, for connections between networks and non-carrier end-user (NCEU) customer premises equipment (CPE). Specific technical parameters such as signal power, longitudinal balance, and encoded analog content are defined, including numeric limits for each parameter. The fundamental purpose of CFR Part 68 is to set safe technical operating limits for CPE connected to telephone networks in order to prevent defined harms. Part 68 also prescribes a CPE registration process that certifies equipment manufactured for such applications. CPE must be certified and assigned an FCC Registration Number, in order to be legal for connection to the network.

Traditional loop plant telephony architecture provides each NCEU a dedicated transmission path all the way back to the telephone switching central office. The physical/logical "star" topology (FIG. 1A) of typical telephone networks and the CPE technical limits set forth in Part 68 work together to prevent harms. As an example, registered CPE conforming to Part 68 longitudinal balance and signal power requirements will maintain pair-to-pair isolation in the twisted copper pair loop plant, and no crosstalk (interference) harm will be experienced by third parties connected to the same network. If, however, the CPE unbalances the otherwise balanced network twisted pair, and/or exceeds signal power limits, the neighbors of the offending NCEU CPE may experience service disruptions.

Part 68 can be described as technology-specific regulation. Simply stated, Part 68 does not contemplate the bus-based HFC architecture (FIGS. 2A and 2B) as a delivery vehicle for telephony and other interactive services, as part of the public switched telephone network (PSTN). New technology ("cable phone") provides the ability to derive telephony and other interactive services on HFC networks, such as may be employed by cable television system ("CATV") operators. HFC networks are susceptible to inadvertent or malicious jamming, due to the common bus topology that provides all connected parties with direct electrical access to all of the downstream and upstream bandwidth on the system. The jamming signals do not even have to be directly on the frequency of a particular service to produce harm. Jamming signals may take many forms, including single frequencies, harmonics, intermodulation products, and combinations thereof. Interfering jamming signals in a portion of the system frequency spectrum that has no services may still harm services in other portions of the spectrum.

Existing cable phone products can be found as part of the network either external to customer premises, or if within premises, in a form similar to the traditional set-top box associated with video services. In either case, the fundamental HFC bus architecture provides each connected NCEU with direct electrical access to the entire upstream and downstream bandwidth at traditional F-fitting coaxial cable jacks inside premises. Conventional telephony star architectures do not permit such direct access. Absent some means to prevent the potential harm of jamming from NCEU premises, HFC technology for loop connection to the PSTN puts lifeline telephone services of all customers so served at substantially greater risk. State-of-the-art HFC systems currently connect 300–400 homes to a common coaxial cable bus. One interfering jammer has the ability to deny service to all connected homes. While disruption of broadcast video, or other "one way" video services offered as part of conventional cable service, would be an aggravation, denial of lifeline telephone service to an entire area of a community by simple jamming is completely unacceptable.

SUMMARY OF THE INVENTION

The invention is a method and apparatus to detect spurious signals at or near the connection of individual NCEUs to the common coaxial bus and automatically disconnect the source of the spurious signal. Spurious signals appearing on the HFC drop cable emanating from NCEU premises in the band of frequencies for downstream transmission is one form of the problem. Spurious signals from NCEU premises in the upstream band of frequencies is the second form of the problem. Other than low-level synchronous reflected energy due to marginal return loss of the collective CPE at NCEU premises, there should never be significant spurious/jamming signal energy emanating from the NCEU toward the network in the band of frequencies used for the downstream direction of transmission. In the upstream direction of transmission, authorized signals from the NCEU must remain within specified frequency and dynamic range limits, to avoid harms to the network or third parties on the bus. These basic criteria are part of a defined set of inputs to a jamming detection and disconnection (JDD) device that determine the continued connection of given NCEU or NCEUs. If these and/or other criteria are exceeded, the offending NCEU drop is automatically disconnected from the HFC bus and the operations system is notified of the specific NCEU source of the problem. Basic JDD capabilities can be combined with a connect/disconnect service provisioning capability under control of the operations system. Such capability also enables a variety of other remote testing features such as RF loopback at the tap port device. The JDD device is preferably powered from the network.

In order to further the goal of preventing harms to the network, a continuous "handshaking" protocol between Customer Premise Equipment (CPE) and the JDD device is preferably added to the jamming detection function. By logically ANDing the indication of protocol interruption with indication of the presence of jamming energy, the JDD device is enabled, forcing a latched disconnect of the coaxial drop to NCEU premises. Such logical AND function is required, to prevent ordinary commercial power interruption to CPE from forcing an unnecessary service disconnect. The JDD concept can be implemented as a stand-alone function that will work with any and all cable phone devices. The use of JDD is not limited to lifeline telephony services harms prevention, and is equally applicable to all services delivered on HFC networks.

DESCRIPTION OF THE PREFERRED EMBODIMENT

Figure 1A:
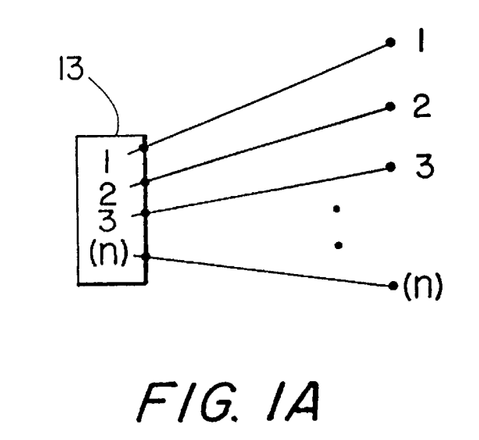
FIG. 1A illustrates a "star" type private line network architecture and FIG. 1B illustrates star type party line architecture.
Figure 1B:
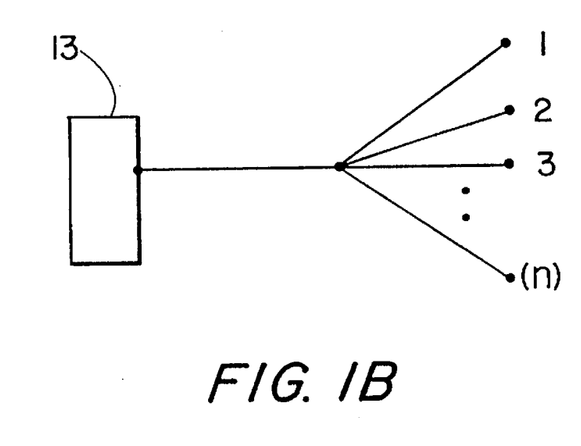

Like reference numerals will denote like structure throughout the description of the various figures. Safeguarding the integrity of the network is a fundamental rule in the telephone industry. This is required by law and violators are subject to heavy penalties. Telephone subscribers also have the expectation that their usage and their communications will be kept secure and will not be subject to interruptions in service. Traditional loop plant architecture provides each subscriber a dedicated transmission path all the way back to the switching central office. Except for the deliberate case of multi-party service, the physical "star" topology ensures that every subscriber's communication is not available to others who are not a party to the communications. In addition, in this architecture, because the subscriber has a virtual private line connection to the central office/switch, any jamming or interference emanating from the subscriber premises toward the network would not likely impact other subscribers on that network. Referring to FIGS. 1A and 1B, a star type network architecture is shown. A star architecture is a physical point-to-multipoint arrangement. There are two types of star architectures. In FIG. 1A a private line type of star is shown. That is, each of lines 1, 2, 3, . . . (n) is separate and distinct and provides a dedicated transmission path to the central office. In FIG. 1B, a party line type of star architecture is shown. In the architecture of FIG. 1B each of the parties commonly connected in this manner may listen to the communications of any of the others. Such party line configurations, once common for cost reasons, are gradually being eliminated as networks are modernized.

Figures 2A, 2B:
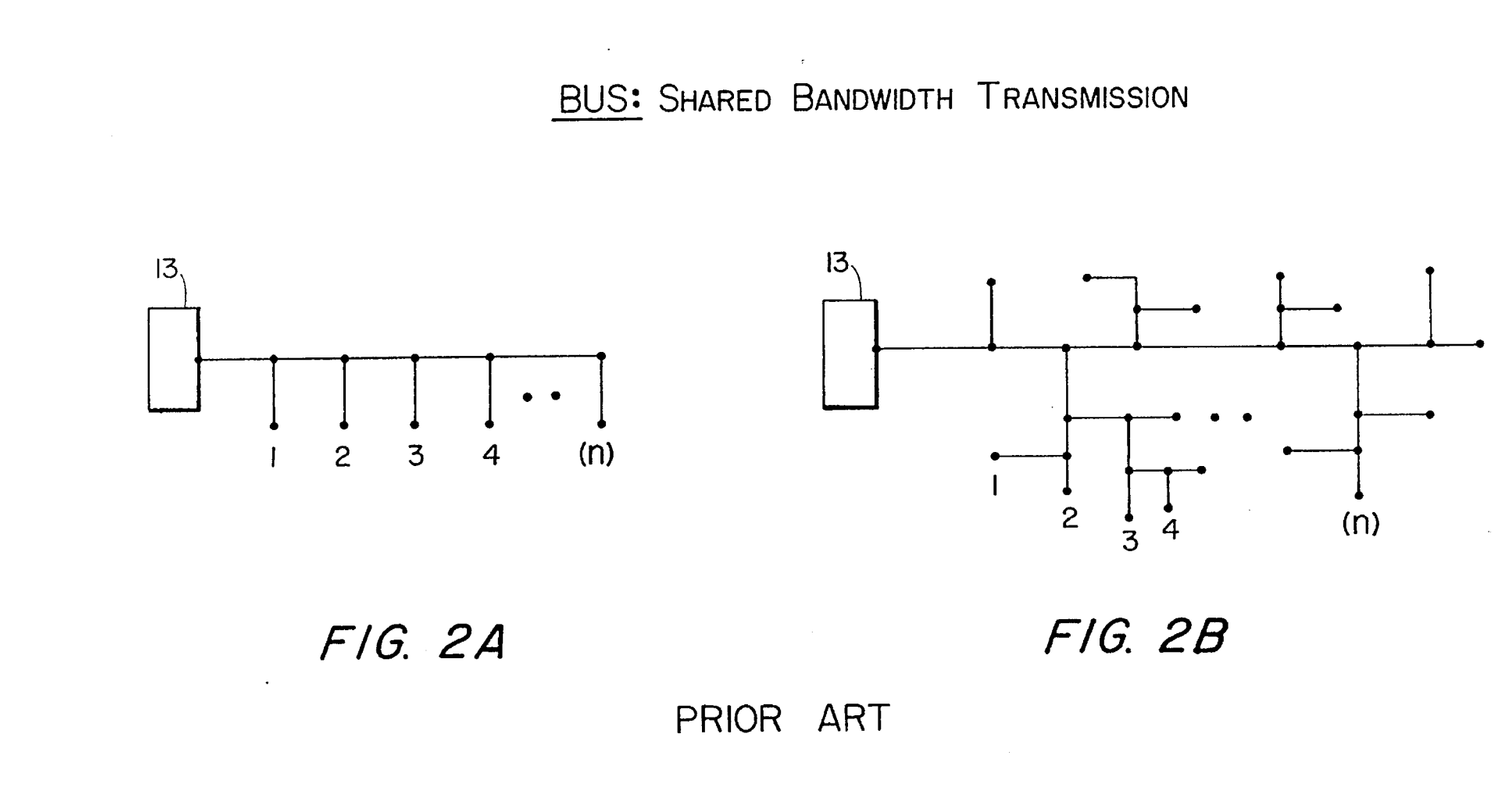
FIG. 2A illustrates a traditional "bus" type architecture and FIG. 2B illustrates a cable type bus architecture.

Cable television systems are configured in a broadcast bus (bus-based) architecture, and all services carried on such systems are inherently available to all subscribers connected to the bus, including telephone channels carried in the passband. A logical bus type of architecture is illustrated in FIG. 2A. In a bus architecture all users share common bandwidth as in a party line star architecture. Generally, cable companies employ a "tree-and-branch" style bus architecture (FIG. 2B). This is essentially a logical bus on a tree and branch physical structure. Similarly, a party line architecture (FIG. 1B) is essentially a logical bus on a physical star. In any event, the bus style architecture used by cable companies, while sufficient for delivery of video services, does not ensure that telephony or interactive video communications services will be secure. As interactive services that use voice-response units flourish, more mass-market customers will routinely be touchtoning such information as credit card numbers and PIN authorizations. In addition to privacy, there is a concomitant security problem with this type of architecture in that it is subject to jamming and spurious signals. That is, spurious energy from one location onto the bus architecture could severely impact or even destroy telephone or other services carried on the network.

Figure 3:
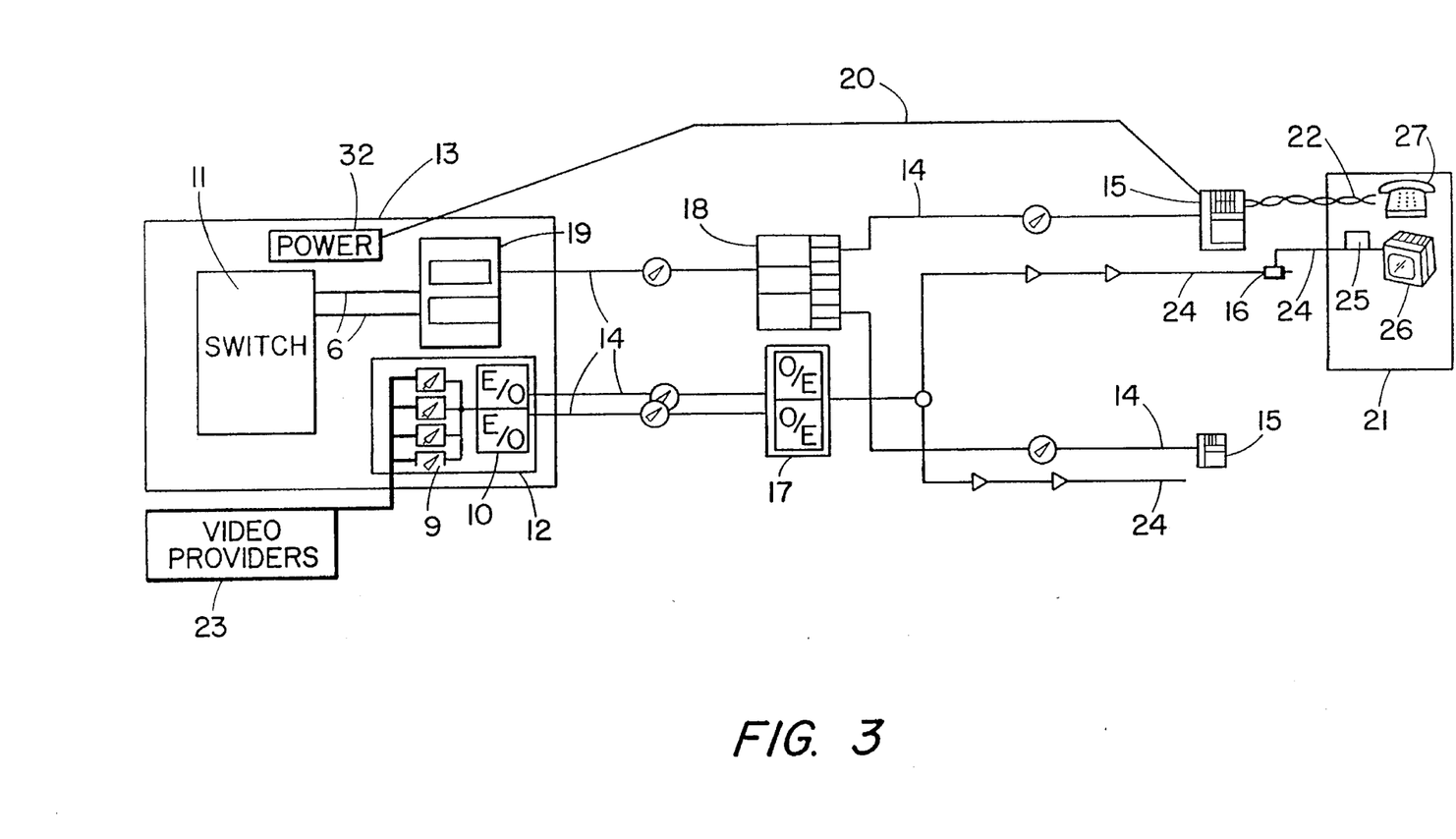
FIG. 3 illustrates a broadband hybrid fiber/coaxial cable network architecture.

Referring to FIG. 3, a broadband hybrid fiber/coaxial cable network architecture is shown. A digital switch 11 and a video transmission device 12 including RF modulators 9 and electric/optical converters 10 are shown in a central office 13. Digital telephony signals are carried over DS1 lines 6 through SONET multiplexer 19 to a fiber optic cable 14. This architecture represents a fiber to the curb (FTTC) type of architecture with a video remote transport overlay. That is, fiber optic cables 14 carry digital telephony signals (SONET OC3) from the central office through a remote digital terminal 18 to an optical network unit 15 (ONU). ONU 15 may include a video interdiction device 16 or interdiction device 16 could be separately located as shown in FIG. 3. The analog video signals (AM-FDM) from a number of video information providers 23 are carried through fiber optic cable 14 to one or more remote nodes which may include an analog passband video receiver 17 which includes optical/electrical converters where the analog optic signals are converted to analog electrical signals on a coaxial cable 24.

A power supply cable 20 which may be a 22 gauge electrical cable supplies power directly from power source 32 in central office 13 to optical network unit 15. From optical network unit 15 telephony services may be provided to subscriber premises 21 over a conventional twisted copper pair line 22 to a telephone 27. Typically an ONU serves up to eight subscriber locations. Video services from a number of video information providers 23, such as satellite systems or video storage/retrieval equipment, or other suppliers are provided to subscriber premises 21 through coaxial cable 24. A video set-top converter 25 may or may not be required to descramble these video signals to a television 26.

The network depicted in FIG. 3 avoids several problems associated with the delivery: of telephony and video signals to the home. That is, since the signals are carried on separate transport systems, each of the signals may be treated separately. For example, telephone 27 in subscriber premises 21 may be powered from central office 13 as is done in conventional telephony. Powering of the set-top converter 25 and television 26 may be done from subscriber premises 21. In addition, privacy and security for telephony services over copper wire 22 are maintained as in a conventional telephony network. As is known in the art, more than one ONU could be connected to terminal 18. Similarly, more than one interdiction tap 16 could be connected to receiver 17. The drawbacks with the network shown in FIG. 3 include complexity and cost. That is, fiber optic cable 14, power cable 20, and coaxial cable 24 must be laid from each central office 13 to each optical network unit 15 or subscriber premises 21. In addition, additional equipment such as remote digital terminals 18 are required to efficiently transport the optical signals.

Figure 4:
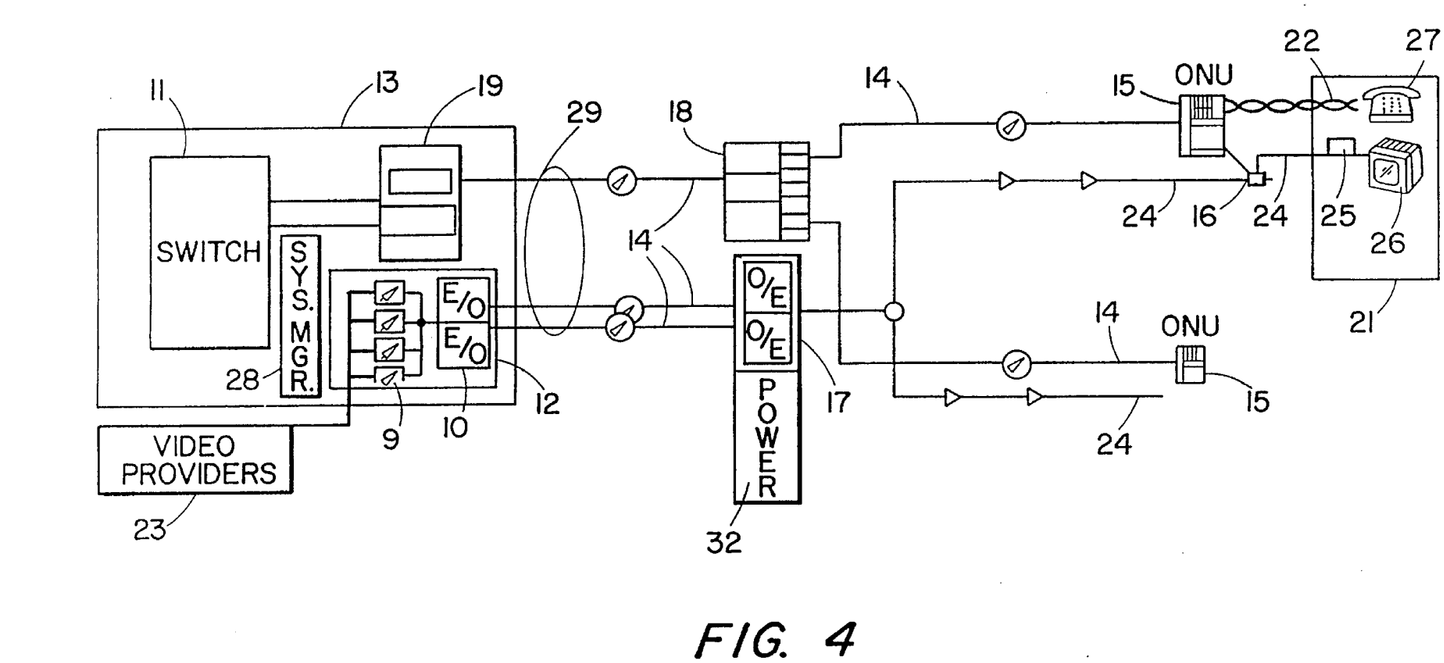
FIG. 4 illustrates an alternate hybrid fiber/coaxial cable network architecture.

Referring to FIG. 4, an alternate hybrid fiber coax network is illustrated. As with FIG. 3, central office 13 includes telephone switch 11 and video transmission equipment 12 from which a system manager 28 controls various ancillary functions of video services supplied from providers 23. As with the architecture in FIG. 3, telephony signals and video signals are carried from central office 13 on fiber optic cable 14 through the feeder portion of the outside plant 29. The telephony signals are passed through remote digital terminals 18 and supplied through fiber optic cable 14 to optical network unit 15. The video signals are transported to video receiver 17 where they are converted from optical to electrical signals on coaxial cable 24. The video signals are then supplied to interdiction device 16 at the location of the optical network unit 15. In this embodiment ONU 15 and interdiction device 16 are connected and preferably colocated. The major difference between FIG. 4 and FIG. 3 is that power may be supplied through coaxial cable 24 by a power supply 32 which may include an electrical connection to the electrical utility and backup batteries.

The elimination of power supply cable 20 in FIG. 4 represents a significant cost savings and simplification over the architecture of FIG. 3. As with FIG. 3, the video signals through coaxial cable 24 are supplied to customer premises 21 through interdiction unit 16 contained in optical network unit 15. Power is now supplied to telephone 27 from power supply 32 through coaxial cable 24 and ONU 15. Coaxial cable 24 from interdiction device 16 to customer premises 21 supplies only video signals to television 26 and does not supply power. As with FIG. 3, a video set-top converter 25 may or may not be included in the system.

While the architecture of FIG. 4 is an improvement on that of FIG. 3, it would be even more significant if the telephony signals and the video signals could be carried on a common transport system, thus eliminating the duplication of fiber optic cables shown in both FIG. 3 and FIG. 4. By carrying the video and telephony signals over a common integral bus based network transmission system, however, other issues are raised. Among the issues raised are privacy of communications and security of the network from spurious signal energy harm described in Part 68 of the CFR. If modulated telephony and video signals were both sent to all subscriber premises 21 over the same coaxial bus, the shared bandwidth may allow a subscriber to "tap" into the telephony signals of all others connected to the bus. This could be done by tuning and demodulating from the myriad of carrier channels on the coaxial cable in the telephony signal range. It would be relatively easy for one minimally skilled in electronics to devise means which could "tune in" on these telephony channels carried in the spectrum. This is possible because the other telephony signals in the example would also emanate from the remote optical node 17. In a bus based coaxial cable system carrying all of these signals a subscriber is able to access the signals of these other subscribers.

In addition to accessing the signals of other subscribers (loss of privacy), access to a bus based network architecture allows for the introduction of spurious signals into the network thus disrupting or destroying the service to subscribers (loss of security). These spurious signals could take the form of jamming energy, either intended or unintended, which is introduced into the network from an access location on the network. For example, an individual having access to the network from his or her premises could deliberately sabotage the service of other subscribers on the network node (this could be as many as 2000 subscribers with current cable technology) by introducing spurious energy into the F-fitting coaxial connector in his or her home. In conventional bus based cable networks the network operator would have great difficulty locating the source of the spurious energy much less removing it from the network. As discussed above, Part 68 of the Code of Federal Regulations requires that the telephony network be kept free of such harms. As cable operators seek to offer common carriage telephony as well as video services (interactive or otherwise) they will be required to address this problem. Of course, intentional jamming is only one form of spurious signal. It may be that the spurious signal is coming from an unintended source unknown to the individual who controls the source. For example, an individual who has improperly connected a piece of electronic equipment in his home to his cable system could unintentionally be the source of the problem. Another possibility is malfunctioning equipment connected at the premises which inadvertently introduces interference into the network.

Figure 5:
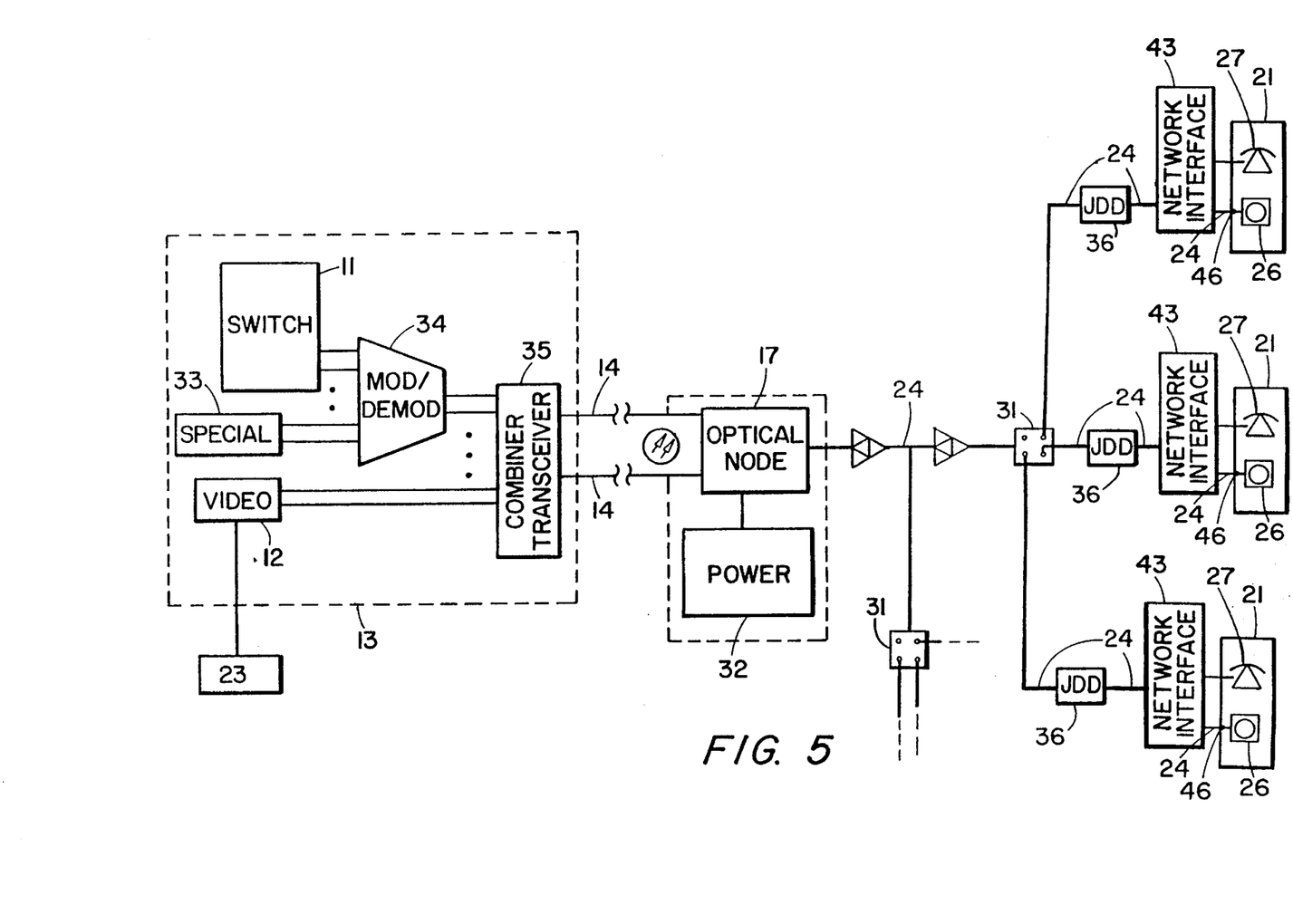
FIG. 5 illustrates the invention used with a hybrid fiber/coaxial cable network architecture.

Referring to FIG. 5, a fiber/coax transport architecture is shown in which the telephony and video signals are transported through a common integral network. That is, central office 13 includes telephone switch 11 and video transmission equipment 12 as shown in FIGS. 3 and 4. Alternative video suppliers 23 could supply video signals to video transmission equipment 12. Telephony signals from switch 11 and from special services equipment 33 are supplied to a digital conversion RF modulator/demodulator unit 34. The telephony signals are modulated to be transported on the analog passband fiber optic cable 14. The video signals from video transmission equipment 12 are combined with the telephony signals in a combiner transceiver unit 35. These optical signals are sent (and received) on fiber optic cable 14 to/from an optical node 17 which includes an optical/ electrical conversion unit as shown in FIGS. 3 and 4. The remote digital terminal 18 as shown in FIG. 4 is eliminated because the distribution function it performs is no longer needed. Power plant 32 is co-located with optical node 17. By elimination of remote digital terminal 18 and the associated fibers in the main fiber optic cable, significant cost savings are achieved by this architecture over that shown in FIG. 4. It is the elimination of remote digital terminal 18 on the ONU 15 which raises both the privacy and spurious signal issues.

The combined telephony and video signals from optical node 17 along with the power supply from power plant 32 are carried on coaxial cable 24 to a power passing tap 31. Power for the signaling and supervision functions inherent in the provision of telephony service as well as the telephony signal are supplied to telephone 27 on subscriber premises 21 through a network interface 43. Similarly video signals are supplied to television 26 on subscriber premises 21 through network interface 43. Absent the present invention, there is no protection against spurious energy introduced from one location 21 in the bus architecture which would interfere with the service at another location 21 on the bus based network. In order to alleviate this problem a jamming detection and disconnection (JDD) device 36 is connected to the network between the point at which signals to an individual location 21 are tapped and the physical premises at location 21. Preferably, the JDD device 36 is located in a curbside unit or other external location controlled by the system operator. Locating the JDD device on the customer premises would allow an unscrupulous individual to tamper with the device. Co-locating the device on the premises would also defeat the purpose of the device if it were not connected prior to splitting of the signals at network interface 43. By locating the JDD device prior to the tapping of the telephony signal the offending subscriber would cut off his own phone service where the spurious energy was from his own location. One alternative would be to insert the JDD device into the network after the subscriber telephony service has been derived.. With this arrangement a subscriber would still maintain telephony service but would be prevented from introducing spurious energy into the network through the coaxial cable F fitting connector 46 through which he or she is supplied video. Thus, only video service would be disconnected by the JDD device.

Figure 6:
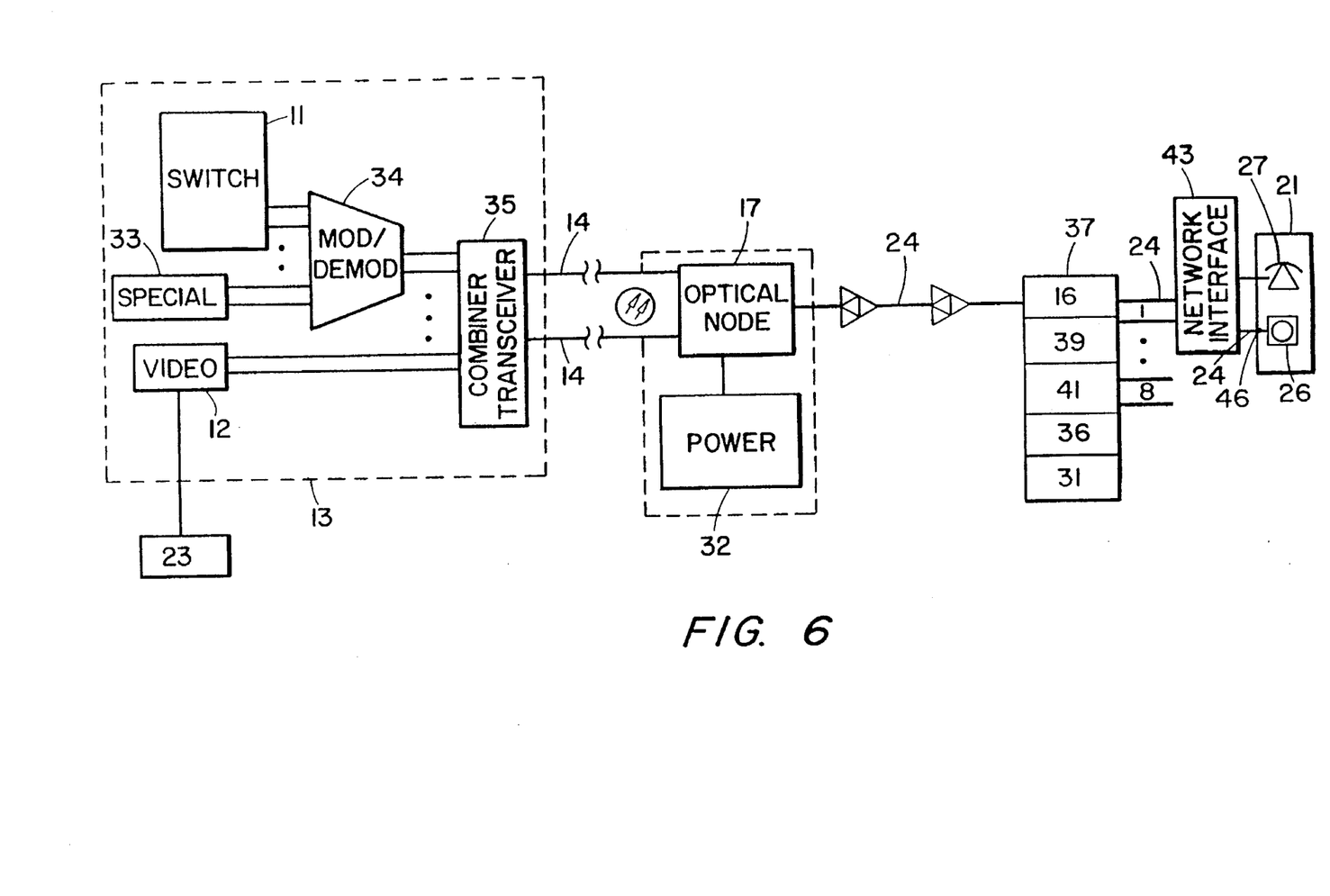
FIG. 6 illustrates the invention used with an alternate embodiment of a hybrid fiber/coaxial cable network architecture.

Referring to FIG. 6, a preferred fiber/coax transport architecture is shown in which the telephony and video signals are transported through a bus based hybrid fiber/coax network. This architecture is identical in form and function to that of FIG. 5 except in the location of the JDD device 36 and the power passing tap 31. In this embodiment, the power passing tap 31 and JDD device are incorporated into BBP device 37 along with means to modulate/demodulate the signal 39 and means for interdicting and isolating the signal 16 to ensure privacy. As with the architecture of FIG. 5 the signaling and supervision functions including the talk battery and ringing voltage are powered from the network by power plant 32 through a power converter 41 in BBP device 37.

Figure 7:
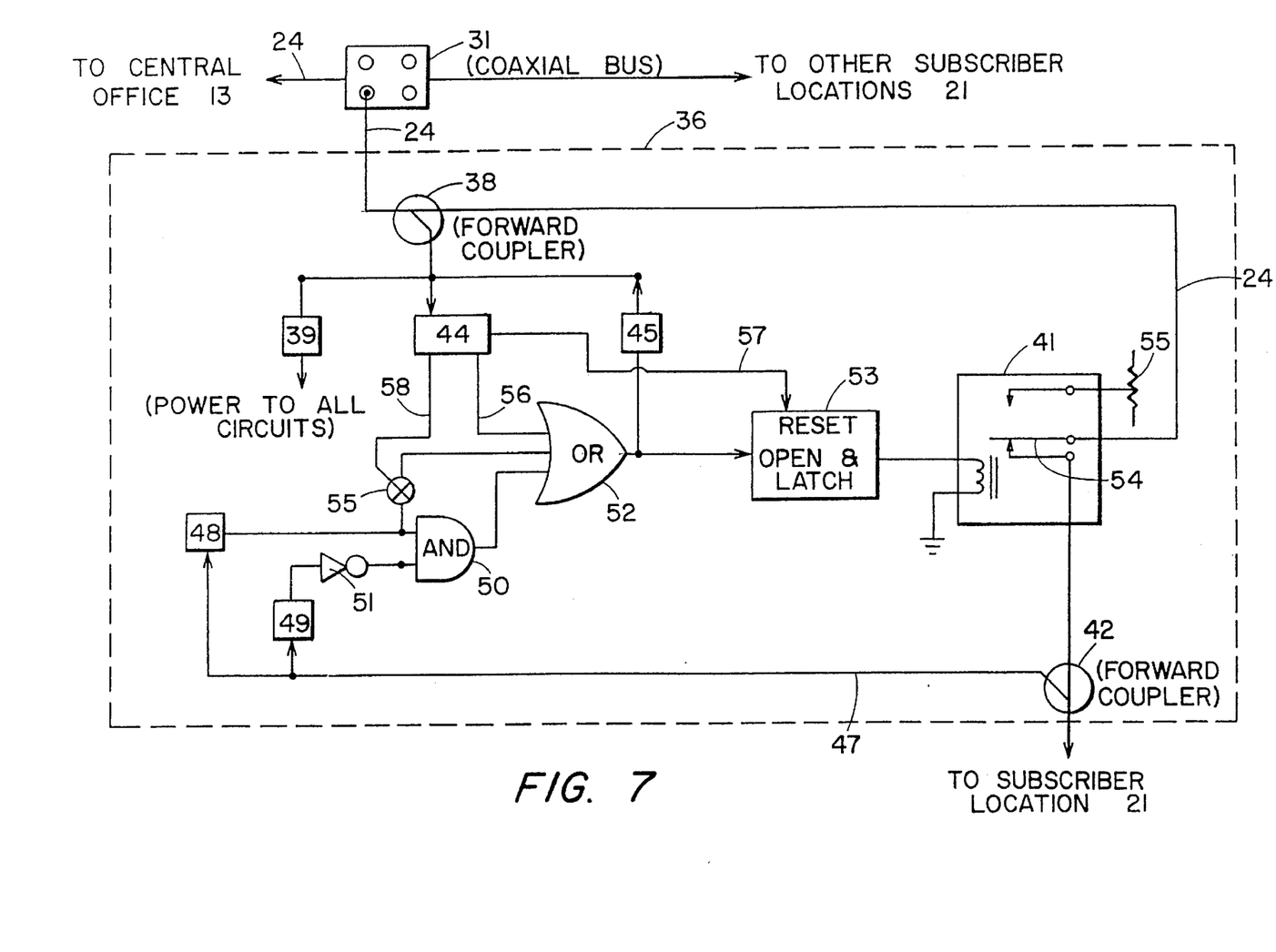
FIG. 7 is a functional schematic illustrating the jamming detection and disconnection system.

Referring to FIG. 7, the JDD device 36 is shown in greater detail. The telephony and/or video signals to the subscriber location are carried from the headend/central office 13 on coaxial cable 24. Power passing tap 31 which may be a four-port (shown), eight-port or other tap as is known in the art, taps the video and/or telephony signals and transports them on coax 24 to the JDD device 36. A forward coupler 38 provides 60 VAC network power to converter 39 which in turn provides voltages for all circuits in the JDD device. In normal operation, the signals to and from the headend are conducted through coax 24, coupler 38 and relay 41 to forward coupler 42 and thence to subscriber location 21. Signals from the headend 13 through coupler 38 are also transported to addressable receiver and decoder (ARD) 44 and signals to the headend from an identification transmitter 45 (IDTX) are also routed through coupler 38. The signal from IDTX is used to uniquely identify a particular subscriber location as is known in the art. A drop port 47 from coupler 42 provides the same signals emanating from subscriber location 21 to a foreign signal detector (FSD) 48 and a pilot and protocol detector (PPD) 49. FSD 48 detects spurious signals introduced from subscriber location 21 and provides an input to AND gate 50. PPD 49 detects a loss of protocol and upon such detection provides a signal through logical inverter 51 to AND gate 50. When both inputs to AND gate 50 are high the AND gate changes state and this positive input changes the state of OR gate 52 which causes relay control 53 to open armature 54 in relay 41. The signal from headend 13 to subscriber location 21 is now shunted to termination 55 which effectively cuts off the service to subscriber location 21. Termination 55 may, for example, be a 75 ohm resistor. When OR gate 52 is enabled by AND gate 50 thereby activating control circuit relay 53 it also enables IDTX 45 which signals headend 13 that this particular subscriber location is the source of spurious energy and loss of protocol and has thus been disconnected from service. The headend control may restore service to the subscriber by a command to ARD 44 to reset relay control 53 which closes armature 54 in relay 41 and thus restores the signal path to the subscriber location 21. Of course, if subscriber location 21 were still the source of spurious energy then the service would immediately disconnect again as described above.

The JDD device thus allows the network operator to determine the source of spurious energy and to attempt to reconnect the subscriber remotely. If the subscriber continues to intentionally inject the spurious energy into the network or is unaware of the spurious energy then the network operator's attempt to remotely restore service will be unsuccessful and a service call would be in order. This same JDD device could also be used to remotely provision service by including a direct connection 56 from ARD 44 to OR 52. With this connection the network operator at headend 13 could send a signal to ARD 44 to enable OR 52 which would disconnect the service to subscriber location 21 at the direction of the headend. As discussed above a reset signal from the headend to relay control 53 through connection 57 again connects the service. Remote connection and disconnection (provisioning) is thus achieved. The JDD device as described functions to disconnect service when spurious signals are injected into the network and the pilot and protocol signal associated with telephony is lost.

In some situations only video service is provided to a subscriber. The potential for that subscriber to intentionally or unintentionally inject spurious energy into the network to disrupt service to other video and or telephony subscribers on the network is every bit as great. The inclusion of switch 55 into JDD device 36 addresses the situation if only video service is provided to a subscriber location. By definition there will be no pilot and protocol signal in this situation and PPD 49 is made irrelevant. Switch 55 thus effectively bypasses AND 50. Switch 55 may be manually engaged at the time of service provisioning or it may be engaged or disengaged from ARD 44 through connection 58 in the case of remote provisioning. Use of a set top box generally requires a pilot and protocol signal but a cable ready television does not. In that situation the switch 55 is a desirable feature in the JDD device 36.

While the invention has been disclosed with respect to a preferred embodiment, changes and modifications may be made which are within the intended scope of the invention as defined by the appended claims.

What is claimed is:

1. A system for providing telephony services to a subscriber location comprising:
   a logical bus network including a coaxial cable network;
   a jamming detection and disconnection device electromagnetically connected to said logical bus network, said jamming detection and disconnection device including:
     means, connected to said coaxial cable network, for providing a signal path to said subscriber location;
     means, connected to said signal path, for detecting spurious energy on said signal path;
     means, responsive to said detecting means, for interrupting said signal path; and
     means, connected to said detecting means, for identifying said subscriber location to said network;
     wherein said interrupting means prevents said spurious energy from disrupting service to another subscriber location on said bus based coaxial cable network.

2. A device according to claim 1 wherein said detecting means includes:
   a foreign signal detector; and
   a pilot and protocol detector.

3. A device according to claim 1 wherein said interrupting means includes:
   a relay;
   a relay control electromagnetically connected to said relay; and
   means, electromagnetically connected to said relay control, for resetting said relay control from a network location.

4. A device according to claim 1 wherein said identifying means includes an identification transmitter responsive to a signal from said detecting means.

5. A device according to claim 2 further including:

a switch electromagnetically connected to said interrupting means; and means, electromagnetically connected to said switch, for remotely resetting said switch from a network location.

6. A device according to claim 1 wherein said disrupted service includes telephony service.

7. A device according to claim 1 wherein said disrupted service includes video service.

8. A device according to claim 7 wherein said video service includes an interactive video service.

9. A method for supplying services to a subscriber location comprising:

transporting signals over a logical bus network including a coaxial cable system; and monitoring said signals on said coaxial cable system to and from said subscriber location to prevent spurious energy from being introduced onto said network, said step of monitoring including:
providing a signal path to said subscriber location;
detecting spurious energy on said signal path;
interrupting said signal path in response to said step of detecting; and
identifying said subscriber location to said network;
wherein said step of interrupting prevents said spurious energy from disrupting service to another subscriber location on said bus based coaxial cable network.

10. A method according to claim 9 wherein said step of detecting includes the steps of:

sensing foreign signals on said signal path; and sensing pilot and protocol signals on said signal path.

11. A method according to claim 9 wherein said step of interrupting includes the steps of:

shunting signals on said signal path by means of a relay; and remotely controlling said relay from a network location.

12. A method according to claim 9 wherein said disrupted service includes telephony service.

13. A method according to claim 9 wherein said disrupted service includes video service.

14. A method according to claim 13 wherein said video service includes an interactive video service.

15. A method according to claim 9 further including the steps of remotely controlling a switch from a network location to start or stop said step of interrupting.

16. A system for providing video and telephony services to a subscriber comprising: a telecommunications system for providing telephony signals to and from a logical bus network transmission system, said logical bus network transmission system including a fiber optic transmission system and a network coaxial cable system;

a video system electromagnetically connected to said logical bus network transmission system, for supplying video signals on said logical bus network transmission system;

a converter electromagnetically connected with said fiber optic transmission system, for converting said telephony and video optical signals on said fiber optic transmission system to telephony electrical signals and video electrical signals on said network coaxial cable system, and for converting said video and said telephony electrical signals on said network coaxial cable system to video and telephony optical signals on said fiber optic transmission system;

a video delivery system electromagnetically connected with said logical bus network transmission system, for selectively delivering said video signals;

a jamming detection and disconnection device electromagnetically connected to said logical bus network, said jamming detection and disconnection device including:

means, connected to said coaxial cable network, for providing a signal path to said subscriber location;

means, connected to said signal path, for detecting spurious energy on said signal path;

means, responsive to said detecting means, for interrupting said signal path; and means, connected to said detecting means, for identifying said subscriber location to said network;

wherein said interrupting means prevents said spurious energy from disrupting service to another subscriber location on said bus based coaxial cable network.

17. A device according to claim 16 wherein said detecting means includes:

a foreign signal detector; and a pilot and protocol detector.

18. A device according to claim 16 wherein said interrupting means includes: a relay;

a relay control electromagnetically connected to said relay; and means, electromagnetically connected to said relay control, for resetting said relay control from a network location.

19. A device according to claim 16 wherein said identifying means includes an identification transmitter responsive to a signal from said detecting means.

20. A device according to claim 16 further including:

a switch electromagnetically connected to said interrupting means; and means, electromagnetically connected to said switch, for remotely resetting said switch from a network location.

21. A device according to claim 16 wherein said disrupted service includes telephony service.

22. A device according to claim 16 wherein said disrupted service includes video service.

23. A device according to claim 22 wherein said video service includes interactive video service.

24. A method for providing video and telephony services to a subscriber over a logical bus network, said method comprising:

supplying a set of video signals and a modulated telephony signal to a fiber optic transmission system;

converting optical signals on said fiber optic transmission system to electrical signals on a network coaxial cable system and converting electrical signals on said network coaxial cable system to signals on said fiber optic transmission system;

monitoring said telephony signals on said coaxial cable system to and from said subscriber location to prevent spurious energy from being introduced onto said network, said step of monitoring including:

providing a signal path to said subscriber location;

detecting spurious energy on said signal path;

interrupting said signal path in response to said step of detecting; and identifying said subscriber location to said network;

wherein said step of interrupting prevents said spurious energy from disrupting service to another subscriber location on said bus based coaxial cable network.

25. A method according to claim 24 wherein said step of detecting includes the steps of:

sensing foreign signals on said signal path; and sensing pilot and protocol signals on said signal path.

26. A method according to claim 24 wherein said step of interrupting includes the steps of:

shunting signals on said signal path by means of a relay; and remotely controlling said relay from a network location.

27. A method according to claim 24 wherein said disrupted service includes telephony service.

28. A method according to claim 24 wherein said disrupted service includes video service.

29. A method according to claim 28 wherein said video service includes an interactive video service.

30. A method according to claim 24 further including the steps of remotely controlling a switch from a network location to start or stop said step of interrupting.

31. A video and telephony logical bus network including a plurality of telephones operatively connected thereto comprising:

a fiber optic transmission system;

a coaxial cable transmission system connected to said fiber optic transmission system;

a telephone switching system electromagnetically connected to said fiber optic transmission system;

a video provisioning system electromagnetically connected to said fiber optic transmission system; and a jamming detection and disconnection device electromagnetically connected to said logical bus network, said jamming detection and disconnection device including:

means, connected to said coaxial cable network, for providing a signal path to said subscriber location;

means, connected to said signal path, for detecting spurious energy on said signal path;

means, responsive to said detecting means, for interrupting said signal path; and means, connected to said detecting means, for identifying said subscriber location to said network;

wherein said interrupting means prevents said spurious energy from disrupting service to another subscriber location on said bus based coaxial cable network.

32. A device according to claim 31 wherein said detecting means includes:

a foreign signal detector; and a pilot and protocol detector.

33. A device according to claim 31 wherein said interrupting means includes:

a relay;

a relay control electromagnetically connected to said relay; and means, electromagnetically connected to said relay control, for resetting said relay control from a network location.

34. A device according to claim 31 wherein said identifying means includes an identification transmitter responsive to a signal from said detecting means.

35. A device according to claim 31 further including:

a switch electromagnetically connected to said interrupting means; and means, electromagnetically connected to said switch, for remotely resetting said switch from a network location.

36. A device according to claim 31 wherein said disrupted service includes telephony service.

37. A device according to claim 31 wherein said disrupted service includes video service.

38. A device according to claim 37 wherein said video service includes interactive video service.

* * * * *